No. 620,157. Patented Feb. 28, 1899.
B. LÖNS.
BICYCLE BRAKE.
(Application filed Dec. 8, 1897.)
(No Model.) 2 Sheets—Sheet 1.
Fig. 1.
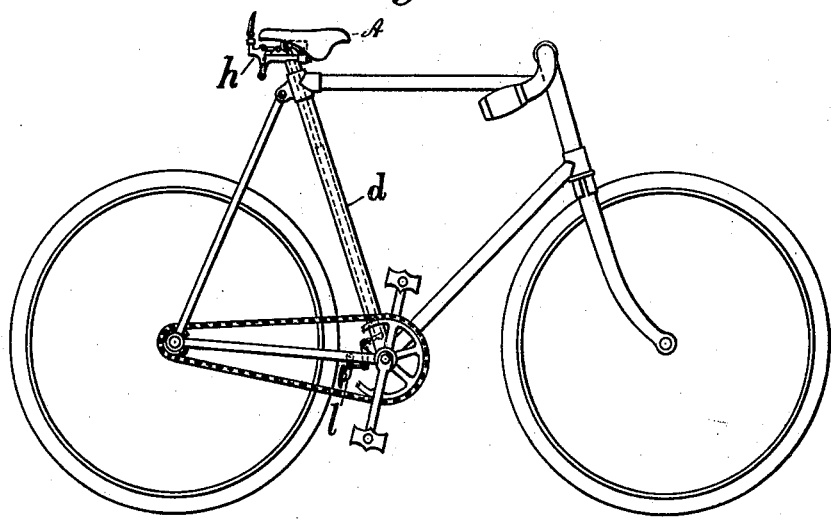
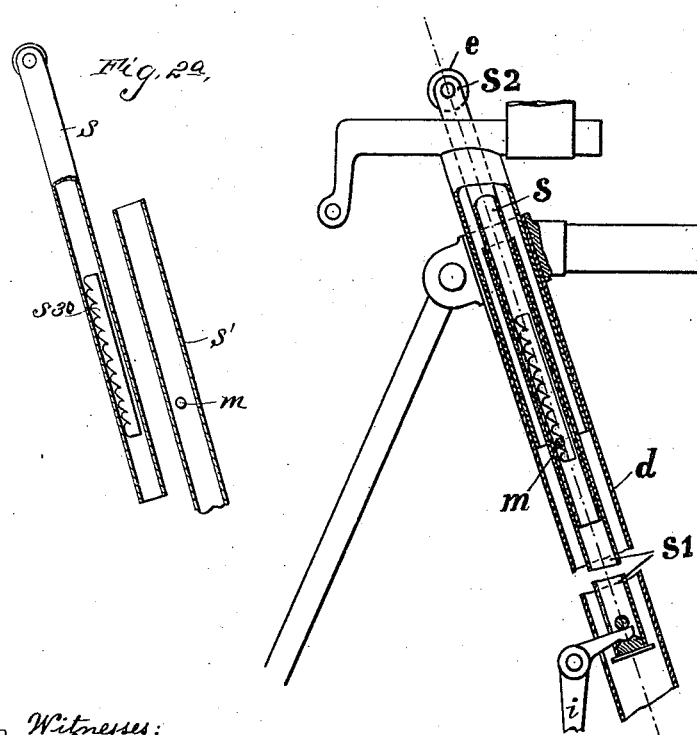
Fig. 2.
Witnesses:
William Miller
William Schulz
Inventor:
Bernhard Löns
by his attorneys
Roeder & Briesen No. 620,157. Patented Feb. 28, 1899.
B. LÖNS.
BICYCLE BRAKE.
(Application filed Dec. 8, 1897.)
(No Model.) 2 Sheets—Sheet 2.
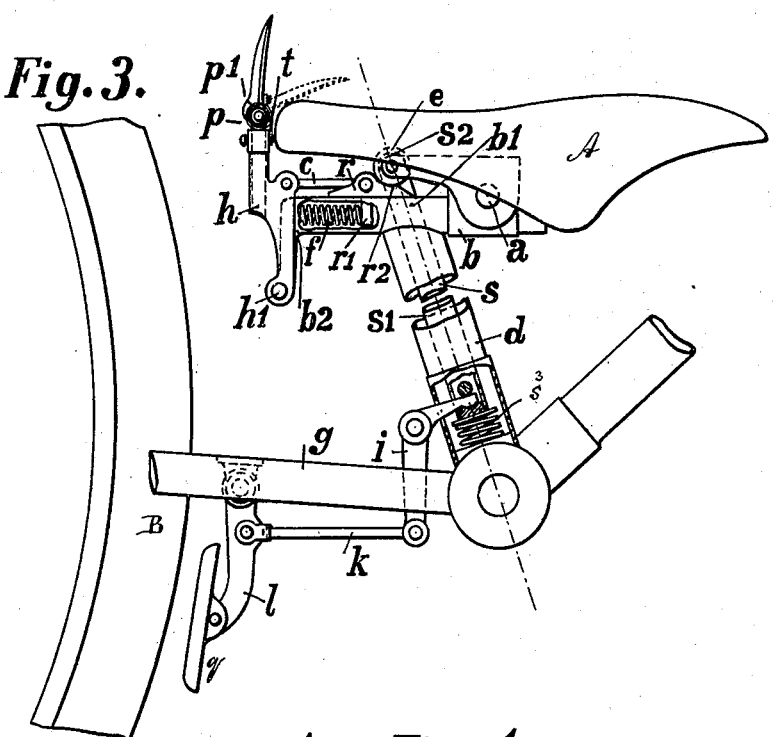
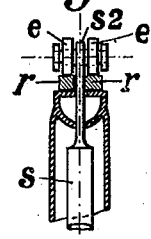
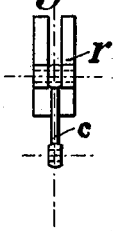
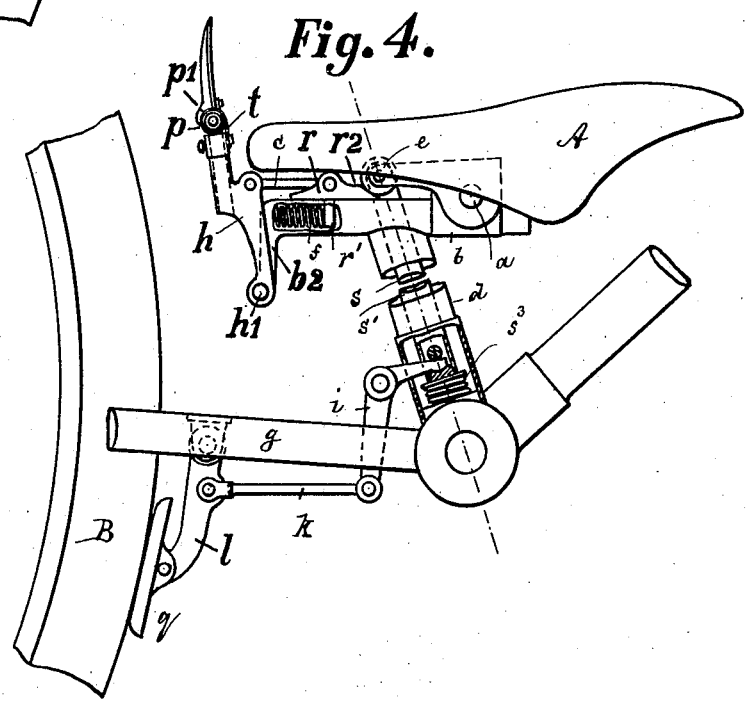

UNITED STATES PATENT OFFICE.

BERNHARD LÖNS, OF WESEL, GERMANY.

BICYCLE-BRAKE.

SPECIFICATION forming part of Letters Patent No. 620,157, dated February 28, 1899.

Application filed December 8, 1897. Serial No. 661,138. (No model.)

*To all whom it may concern:*

Be it known that I, BERNHARD LÖNS, a subject of the German Emperor, residing at Wesel, Rhenish Prussia, Germany, have invented new and useful Improvements in Cycle-Brakes, of which the following is a specification.

This invention relates to brake mechanism for velocipedes which can be operated without using the hand, the brake being applied by the weight of the rider as soon as he leans backward, and thereby releases a bolt.

In the accompanying drawings, Figure 1 is a side elevation of a bicycle provided with a brake embodying my invention. Fig. 2 is a longitudinal section through the rods $s\ s'$. Fig. $2^a$ is a detail of the telescoping rods $s\ s'$; Fig. 3, an elevation of the brake mechanism, showing the brake-shoe off; Fig. $3^a$, a cross-section through the slide $r$; Fig. 4, an elevation of the brake mechanism, showing the brake applied; and Fig. $4^b$, a plan of the slide.

In the example shown by the drawings the saddle A is hinged to the saddle-support $b$ by means of a pin $a$, Fig. 3, and a lever or back-rest $h$, situated behind the saddle, is pivoted to an arm $b^2$ of the saddle-support $b$ by means of a pin $h'$. A wedge-shaped bolt, slide, or stop $r$ is adapted to slide horizontally on the part $b'$ of the saddle-support and is connected with the lever $h$ by a short link $c$. The bolt $r$ has a short arm or lug $r'$ projecting downward through a slot of the part $b'$ and abutting against a coiled spring $f$, which is inclosed in the said part $b'$ and tends to push the bolt $r$ forward.

A roller $e$, situated under the rear part of the saddle, supports the same and is supported by the bolt $r$. The roller-axle has its bearings in the upper extremity of a rod $s\ s'$, guided in the diagonal stay or saddle-supporting tube $d$ of the cycle-frame.

As shown by Fig. $3^a$, the front part of the bolt $r$ has a slot or recess, through which passes the flattened upper end $s^2$ of the rod $s$. The roller $e$ is composed of two parts situated right and left of the rod $s$.

If the cyclist leans backward, the lever $h$ recedes, Fig. 4, by contact with the back of the rider and withdraws the wedge-shaped bolt $r$ from underneath the roller $e$ by link $c$.

Consequently the saddle, which supports the weight of the rider, will press the roller $e$ and rod $s\ s'$ downward in proportion as the bolt $r$ has been withdrawn. The lower end of the rod $s\ s'$, which when at rest is held up by a spring $s^3$, acts on the upper arm of the bell-crank lever $i$, so as to press the brake-block $q$ against the circumference of the tire B by means of a link $k$ and brake-lever $l$, which connect the lever $i$ with the brake-block. The short arm of the lever $i$ passes through a slot of the tubular stay $d$, and the brake-lever $l$ is pivoted within the fork or between the lower tubes $g$ of the cycle-frame, as shown by the drawings.

If the bolt $r$ is withdrawn completely, the brake acts with great force, because the weight of the rider presses more strongly on the rear part of the saddle. If the rider leans again forward, the rear part of the saddle is partly relieved of its load, and the bolt $r$ is again pressed forward by the spring $f$, so as to support the roller $e$. Consequently the brake is set out of action and remains inactive until the rider again presses upon the lever $h$.

If it is desired to exercise only a weak brake-action, the lever and the bolt are shifted a shorter distance. Consequently the brake-lever will also move a shorter distance.

To insure that the roller $e$ will retain its position when supported by the bolt $r$, as shown by Fig. 3, the latter is not wedge-shaped up to the hinges, but forms a horizontal rest $r^2$. That part of the lever $h$ which projects above the saddle is connected with the lower part by a hinge $p$ and held in its upright position by a spring $t$, so that it can turn forward and down upon the saddle, as indicated in Fig. 3 by dotted lines, if the rider in the act of mounting upon the saddle collides with the said lever. A pair of stops $p'$ are provided to prevent the lever from turning back beyond its vertical position.

In order that the saddle can be placed higher and lower, the brake-rod $s\ s'$ is hollow and composed of two parts adapted to telescope in and out. The inner tube $s$ has a longitudinal slot $s^{30}$, one edge of which has a series of teeth, as shown by Fig. 2, while the outer tube $s'$ is provided with a pin $m$, which rests between the said teeth when the saddle has its normal position. If, however, the saddle be turned into an inclined position, the pin $m$ will get clear of the teeth and can be shifted up and down in the slot, so that the rods $s\ s'$ can be shortened or lengthened according to requirement.

I claim—

1. A cycle-brake composed of a tilting saddle, a supporting-slide, means for operating the slide, a roller between slide and saddle, a rod connected thereto, a brake-shoe, and motion-transmitting mechanism between the rod and brake-shoe, substantially as specified.

2. A cycle-brake composed of a tilting saddle, a back-rest, a spring-actuated slide connected thereto, a roller between slide and saddle, a brake-shoe, and motion-transmitting mechanism between the roller and the brake-shoe, substantially as specified.

3. A cycle-brake composed of a tilting saddle, a back-rest having an upwardly-extending pivoted arm, a spring-actuated slide connected to the back-rest, a roller between slide and saddle, a brake-shoe, and motion-transmitting mechanism between the roller and brake-shoe, substantially as specified.

In testimony whereof I have signed my name to this specification in the presence of two subscribing witnesses.

BERNHARD LÖNS.

Witnesses:
WM. ESSENWEIN,
HCH. LAUSE.